United States Patent Office 3,507,538
Patented Apr. 21, 1970

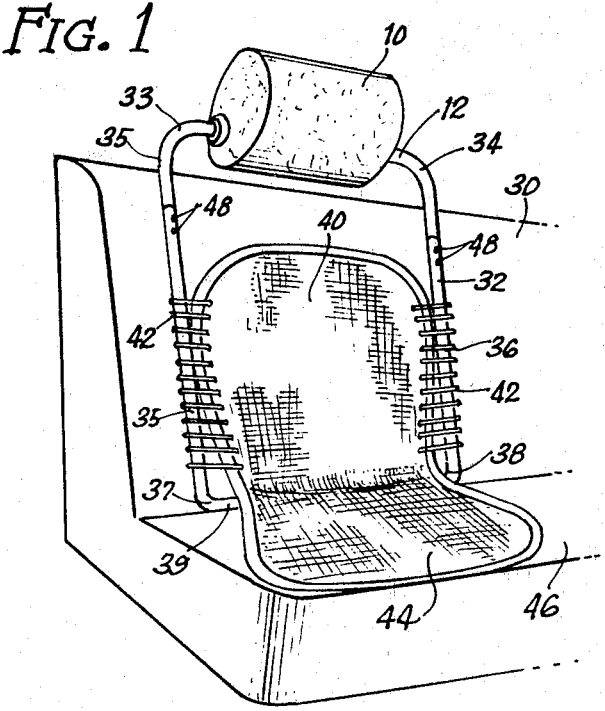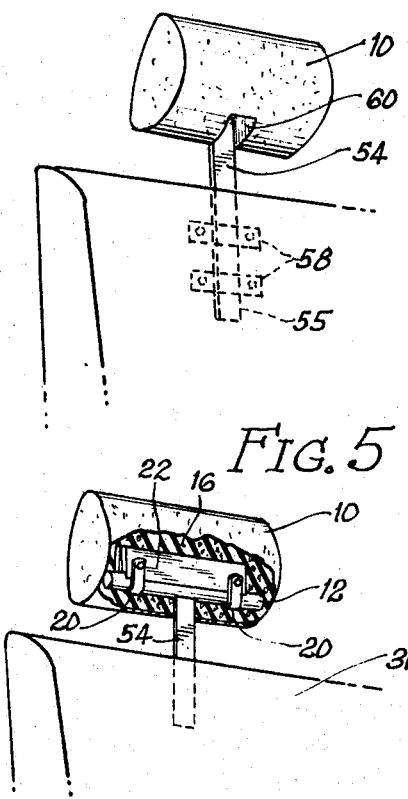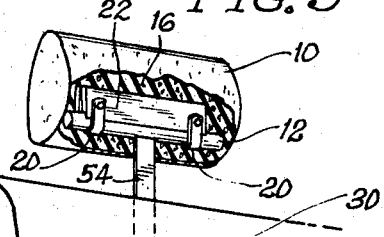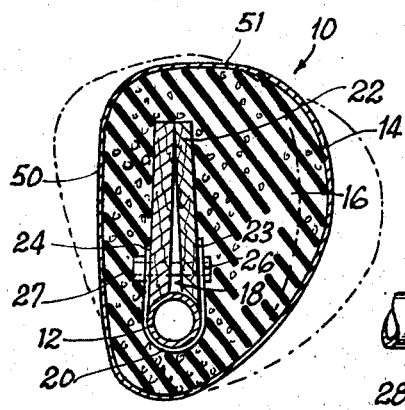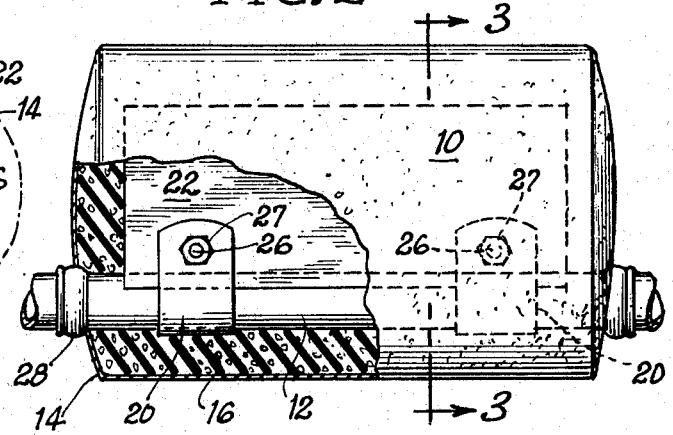

3,507,538
HEADREST
Hylan B. Stoller, 916 W. 54th Place,
Chicago, Ill. 60609
Filed Dec. 4, 1967, Ser. No. 687,542
Int. Cl. A47c 7/36, 7/42
U.S. Cl. 297—410                                        6 Claims

ABSTRACT OF THE DISCLOSURE

A headrest in which the pillow of the headrest rotates about an eccentric axis solely by manipulation of the pillow.

---

This invention relates to a headrest adapted for positioning above the top of a seat, which headrest is extremely simple to manipulate and provides maximum safety for the user.

DISADVANTAGES OF THE PRIOR ART

Headrests are gaining wide acceptance in this country for use in automobiles as a safety device to aid in preventing "whiplash" injuries which may result from an abrupt forward movement of an automobile, such as often occurs when an automobile is struck from behind in a rear-end collision.

Many prior art headrests have been found to be ineffective, and in fact, some prior art headrests have been found actually to be safety hazards. For example, prior art headrests which are clamped to the backrest of the seat depend upon the strength of the clamping action, and therefore may be ineffective if the clamp is not connected properly or is inherently faulty. Other prior art headrests, which employ rotatable pillows, have outstanding projections which must be operated by the person desiring to rotate the pillow. Such outstanding projections are undesirable, as they may be dangerous.

ADVANTAGES OF THIS INVENTION

It is very advantageous to have a headrest (1) that will remain relatively stationary notwithstanding an abrupt forward movement of the automobile causing the user's head to be forced against the headrest, (2) in which the pillow is movable to provide a proper positioning for users of different heights and different comfort requirements, and (3) in which such adjustments may be made solely by manipulation of the pillow itself, without the necessity of operating any levers or other outstanding projections. The headrest of the present invention incorporates these advantages and obviates the above-mentioned disadvantages of prior art headrests.

SUMMARY OF THE INVENTION

In the present invention, there is provided a headrest adapted for positioning above a seat backrest. The headrest comprises a pillow, the interior of which defines an opening. An elongated rigid member is positioned within the opening, and means frictionally and rotatably connecting the interior of the pillow body to the rigid member are provided.

The rigid member is located intermediate a generally central pillow axis and a side of the pillow, thereby providing an eccentric axis of rotation for the pillow. The frictional connecting means and the rigid member cooperate to enable the pillow to be rotated on an eccentric axis solely by manipulation of the pillow, without the necessity of operating any handles, levers or other externally projecting members.

In the illustrative embodiment of FIGURES 1, 2 and 3, rigid member comprises a tube having a circular cross-sectional configuration. The axis of the portion of the tube within the pillow is coincident with the eccentric axis about which the pillow rotates. The tube extends outwardly from both ends of the pillow and bends are formed in the tube, with a large portion of the tube extending from each bend in a direction perpendicular to the eccentric axis, to form a frame. A panel is connected to the frame for overlying the backrest of the seat and for aiding in the retention of the frame in place when a person is sitting on the seat with his back engaging the panel.

In a second embodiment of the invention, the seat backrest has a sleeve for receiving a support member, which support member extends from the rigid member into the sleeve. Means cooperating with the support member are provided for raising and lowering the pillow with respect to the seat backrest.

THE DRAWING

A more detailed explanation of the invention is provided in the following description and claims, and is illustrated in the accompanying drawing, in which:

FIGURE 1 is a perspective view of one embodiment of a headrest utilizing the principles of the present invention;

FIGURE 2 is an enlarged rear elevation of the pillow shown in FIGURE 1, with a portion cut away to illustrate the interior thereof;

FIGURE 3 is a sectional elevation taken along the line 3—3 of FIGURE 2;

FIGURE 4 is a perspective view of a second embodiment of the headrest utilizing the principles of the present invention; and FIGURE 5 is a perspective view of the headrest of FIGURE 4, with portions broken away.

DESCRIPTION OF A SPECIFIC EMBODIMENT

In the illustrative embodiment of FIGURES 1, 2 and 3, the headrest includes a pillow 10 rotatably positioned upon a rigid tubular member 12. In the embodiment shown, the pillow 10 comprises a cover 14 formed of a vinyl material, which encloses a high density Polyfoam material 16.

Material 16 defines an opening 18 in which is positioned apparatus for frictionally and rotatably connecting the pillow 10 to the tube 12. The connecting apparatus includes a pair of clamps 20 which frictionally engage the tube 12, and a wooden spacer arrangement 22 which serves to maintain the position of the tube 12 and clamps 20. The ends 23 and 24 of the friction clamps 20 are fastened to the spacer arrangement 22 by means of a bolt 26 and nut 27. The degree of frictional engagement between the clamps 20 and tube 12 can be adjusted by tightening or loosening the bolt 26 with respect to nut 27.

As seen most clearly in FIGURE 2, a pair of rings 28 encircle the tube 12 on each side of the pillow, in order to prevent lateral displacement of the pillow with respect to the tube.

The pillow has a generally oval cross-sectional configuration with the rear side 50 generally flattened, or in other words a generally ovate cross-section. The tube 12 is located intermediate a central longitudinal axis of the pillow and the outer surface thereof, in order to provide rotation of the pillow about an eccentric axis. In this manner, rotation of the pillow enables a selection of a large number of head receiving positions. For example, some persons may prefer that the back of their heads rest against the pillow at all times. To this end, the pillow shown in FIGURE 3 could be rotated in the clockwise direction until the side 51 is at the right-hand portion of FIGURE 3, so that the pillow extends forward to the maximum extent possible. The eccentric axis of rotation allows the pillow to assume an indefinite number of positions, varying with the particular comfort desires of the persons using the headrest.

Referring to FIGURE 1, it is seen that the headrest is positioned with respect to the backrest 30 by means of a seat panel and frame arrangement. A frame 32 is formed by providing bends 33 and 34 and then extending portions 35 and 36 of the tube in a perpendicular direction with respect to the axis of rotation of the pillow. Additional bends 37 and 38 are provided with a further tube portion 39 bridging two portions 35 and 36 to provide a substantially rectangular frame structure.

A woven fabric panel 40 is provided between portions 35 and 36 and is fastened thereto by means of stitching 42. The panel 40 has a forwardly extending panel portion 44 which will overlie the seat 46 when the panel 40 overlies the backrest 30.

In the form of the invention illustrated in FIGURE 1, portions 35 and 36 of the frame 32 are telescopic in order to accommodate persons of different heights. The lower U-shaped portion of the frame has a slightly larger internal diameter than the external diameter of the upper U-shaped portion of the frame, and therefore the upper U-shaped portion can slide within the lower U-shaped portion. The upper U-shaped portion defines holes for receiving screws 48, which retain the U-shaped portions in position with respect to each other.

The headrest has been found to be very effective, because it is retained in position by the weight of the person using it. When the person sits on panel 44 with his back against panel 40, the entire unit utilizes the weight of the person to effect stationary positioning of the headrest. If the device is used in an automobile which is struck from the rear causing an abrupt forward movement, the person sitting on the seat will be urged backwards, thereby providing an additional force tending to maintain the device in a stationary position.

DESCRIPTION OF SECOND EMBODIMENT

In the embodiment of the invention illustrated in FIGURE 4, the top of the backrest 30 is provided with a sleeve which receives a support member 54. The support member 54 is welded to tube 12, as shown in FIGURE 5. The lower end portion 55 of the support member extends into the sleeve and is retained within the sleeve by a pair of frictional clamps 58. These frictional clamps enable the pillow to be raised and lowered by merely being pulled up and down, thereby causing the support member 54 to slide with respect to the frictional clamps.

In the embodiment of FIGURES 4 and 5, the pillow defines a slot 60 which enables the pillow to be rotated about the tube 12 between the outer ends of the slot.

A headrest has been described herein which is very simple to manipulate and provides maximum safety for the user. The headrest used in an automobile will remain relatively stationary notwithstanding an abrupt forward movement of the automobile, causing the user's head to be forced against, and thus to be supported by, the headrest. Further, the headrest pillow is movable to provide a proper positioning for users of different heights and different comfort requirements.

Although two illustrative embodiments have been shown and described, it is to be understood that various modifications and substitutions may be effected by those skilled in the art without departing from the spirit and scope of the present invention. For example, the frame and the panel thereto may be formed of various materials, or may be formed as an integral unit, if desired. Numerous materials may be utilized in the pillow construction, and the pillow may be shaped differently than shown in the illustrative embodiments. Further, the means for raising and lowering the pillow with respect to the seat may take various forms.

What is claimed is:

1. A headrest adapted for positioning above the top of a seat backrest which comprises: a pillow body, the interior of said pillow body defining an opening; an elongated rigid member positioned within said opening; means frictionally and pivotally connecting said interior of the pillow body to said rigid member; said rigid member being located in an eccentric pillow axis, thereby providing an eccentric pivotal axis for said pillows; said frictionally connecting means and said rigid member cooperating to enable said pillow to be pivoted about said eccentric axis solely by manipulation of said pillow; said rigid member comprising a tube, the axis of the portion of said tube within said pillow being coincident with said eccentric axis, said tube extending outwardly from both ends of said pillow and having bends formed on each side of said tube with a large portion of said tube extending from each bend in a direction perpendicular to said eccentric axis to form a frame; a panel connected to said frame for overlying said seat backrest and aiding in the retention of said frame in place when a person is sitting on said seat with his back engaging said panel.

2. A headrest adapted for positioning above the top of a seat backrest as described in claim 1, wherein said panel comprises a portion extending freely from said frame to overlie the seat, whereby the weight of a person sitting on said seat will effect substantial retention of said frame in place.

3. A headrest adapted for positioning above the top of a seat backrest as described in claim 1, wherein said large portion of said tube is formed in a plurality of sections with adjacent sections being telescopic with respect to each other, whereby said frame is adjustable to compensate for varying heights of persons using the headrest.

4. A headrest adapted for positioning above the top of a seat backrest as described in claim 1, wherein said rigid member is a tube having a circular cross-sectional configuration and said connecting means comprises a friction clamp; and means carried by said pillow for supporting said friction clamp.

5. A headrest adapted for positioning above the top of a seat backrest which comprises: a pillow body, the interior of said pillow body defining an opening; an elongated rigid member positioned within said opening; means frictionally and pivotally connecting said interior of the pillow body to said rigid member; said rigid member being located in an eccentric pillow axis, thereby providing an eccentric pivotal axis for said pillow; said frictionally connecting means and said rigid member cooperating to enable said pillow to be pivoted about said eccentric axis solely by manipulation of said pillow; a support member extending downwardly directly from said rigid member and adapted for connection to said seat backrest; said pillow body defining a slot to enable said pillow body to be pivoted with respect to said support member.

6. A headrest as described in claim 5 including a backrest having a sleeve for receiving said support member; means cooperating with said support member for raising and lowering said pillow with respect to said seat backrest, said means for raising and lowering said pillow including a frictional clamp within said sleeve in frictional engagement with said support member.

References Cited

UNITED STATES PATENTS

| | | | |
|---|---|---|---|
| 2,307,621 | 1/1943 | Dorton | 797—403 X |
| 2,865,434 | 12/1958 | Grenz | 297—403 |
| 3,205,005 | 9/1965 | Brown | 297—397 |
| 3,223,447 | 12/1965 | Terracini | 797—397 |
| 3,328,082 | 6/1967 | Lilleso | 297—399 |
| 3,388,631 | 8/1967 | Smith | 297—397 |
| 3,369,786 | 2/1968 | Schloemer | 297—397 |

CASMIR A. NUNBERG, Primary Examiner

U.S. Cl. X.R.

297—231, 397

UNITED STATES PATENT OFFICE
CERTIFICATE OF CORRECTION

Patent No. 3,507,538 April 21, 1970

Hylan B. Stoller

It is certified that error appears in the above identified patent and that said Letters Patent are hereby corrected as shown below:

Column 3, line 66, after "panel" insert -- fastened --.
Column 6, line 70, "3,388,631" should read -- 3,338,631 --.

Signed and sealed this 16th day of February 1971.

(SEAL)
Attest:

Edward M. Fletcher, Jr.
Attesting Officer

WILLIAM E. SCHUYLER, JR.
Commissioner of Patents